(12) United States Patent
Lee et al.

(10) Patent No.: US 9,681,655 B2
(45) Date of Patent: Jun. 20, 2017

(54) TREE STAND INCLUDING A LATCH AND ADJUSTABLE STRAP

(71) Applicant: Hunt Strategy, LLC, Vassar, MI (US)

(72) Inventors: Scott Lee, Vassar, MI (US); Robert Butcher, St. Charles, MI (US)

(73) Assignee: Hunt Strategy, LLC, Vassar, MI (US)

( * ) Notice: Subject to any disclaimer, the term of this patent is extended or adjusted under 35 U.S.C. 154(b) by 0 days.

(21) Appl. No.: 14/447,492

(22) Filed: Jul. 30, 2014

(65) Prior Publication Data

US 2016/0029617 A1 Feb. 4, 2016

(51) Int. Cl.
*A01M 31/02* (2006.01)
(52) U.S. Cl.
CPC .................................. *A01M 31/02* (2013.01)
(58) Field of Classification Search
CPC ..................................................... A01M 31/02
See application file for complete search history.

(56) References Cited

U.S. PATENT DOCUMENTS

| | | | | |
|---|---|---|---|---|
| 3,289,259 A | * | 12/1966 | Laharty | B66C 1/14 294/74 |
| 3,870,357 A | * | 3/1975 | Wernsing | F16G 11/14 24/114.5 |
| 4,802,552 A | * | 2/1989 | Williams | A45F 3/26 108/152 |
| 4,984,479 A | * | 1/1991 | Phillips | B62D 51/001 74/480 R |
| 5,416,952 A | * | 5/1995 | Dodge | A43C 11/00 24/68 A |
| 5,836,061 A | | 11/1998 | Castillo et al. | |
| 5,975,242 A | | 11/1999 | Woller et al. | |
| 6,182,792 B1 | | 2/2001 | Woller et al. | |
| 6,264,000 B1 | | 7/2001 | Johnson | |
| 6,308,801 B1 | * | 10/2001 | Futch | A01M 31/02 182/136 |
| 6,397,973 B1 | | 6/2002 | Woller | |
| 6,568,505 B1 | * | 5/2003 | D'Acquisto | A01M 31/02 182/136 |
| 6,662,903 B2 | | 12/2003 | Johnson | |
| 6,715,585 B1 | * | 4/2004 | Overbaugh | A01M 31/02 182/133 |
| 6,722,472 B2 | | 4/2004 | Berkbuegler | |
| 6,948,589 B2 | | 9/2005 | Johnson | |
| 7,207,415 B2 | * | 4/2007 | McGehee | A01M 31/02 108/152 |
| 7,544,120 B1 | | 6/2009 | Tardif et al. | |
| 7,802,808 B2 | * | 9/2010 | Neiley | A63C 10/06 280/623 |

(Continued)

FOREIGN PATENT DOCUMENTS

WO 2007123654 A2 11/2007

*Primary Examiner* — Alvin Chin-Shue (57) ABSTRACT

A tree stand includes a frame and a strap for attaching the frame to a tree. The strap includes engagement features and a latch is pivotably coupled to the frame for selectively engaging the engagement features. The latch is pivotable between a locked position for engaging the engagement feature of the strap and an unlocked position for being disengaged with the engagement feature of the strap. The latch includes a finger extending from the body receiving the engagement feature when the latch is in the locked position.

9 Claims, 10 Drawing Sheets (56) References Cited

U.S. PATENT DOCUMENTS

2008/0314683 A1* 12/2008 Bedell .................. A01M 31/02
                                                        182/136
2010/0032238 A1    2/2010 Northburg et al.
2011/0121602 A1*  5/2011 Zielinsky ........... B62D 33/0273
                                                        296/57.1
2012/0080268 A1    4/2012 Bedell

* cited by examiner

TREE STAND INCLUDING A LATCH AND ADJUSTABLE STRAP

BACKGROUND OF THE INVENTION

Field of the Invention

The invention relates to a tree stand for connection to a tree to support a hunter in the tree.

Description of the Related Art

Tree stands are typically used to elevate an occupant, such as a hunter, in a tree. This elevated positioning raises the hunter above the typical sight line of game and improves the sight line and scent control of the hunter. Tree stands can be used by archery hunters, firearm hunters, crossbow hunters, etc.

Tree stands can be removeably mounted to a tree and such tree stands are available in many types and styles such as, for example, climbing stands, stationary hang-on stands, ladder stands, climbing sticks for use with any type of platform, etc. Regardless of the type and style, tree stands commonly include a frame and a strap that extends from the frame for extending around the tree to hang the frame on the tree.

The strap can be adjustable relative to the frame. In other words, the length of the strap extending from the frame can be adjusted to fit trees of various diameters. For example, some tree stands include engagement features on the strap and an engagement mechanism for engaging these engagement features. In such tree stands, these engagement mechanisms are manually moved to engage and disengage the engagement features. Such configurations require two-handed operation for adjustment of the strap, i.e., one hand to operate the engagement mechanism and one hand to move the strap. In such tree stands, positive engagement of the engagement mechanism with the strap can also be difficult to confirm. An opportunity exists to develop a tree stand with improved adjustability of the strap relative to the frame.

SUMMARY OF THE INVENTION AND ADVANTAGES

The present invention includes a tree stand comprising a frame and a strap for attaching the frame to a tree. The strap includes at least one engagement feature. A latch includes a body pivotably coupled to the frame and pivotable relative to the frame between a locked position for engaging the engagement feature of the strap and an unlocked position for being disengaged with the engagement feature of the strap. The latch includes a finger extending from the body and defines a recess between the finger and the body for receiving the engagement feature when the latch is in the locked position. The finger extends from the body along the recess at an acute angle relative to the body for guiding the engagement feature into the recess.

The present invention also includes a tree stand comprising a frame and a strap for attaching the frame to a tree. The strap includes at least one engagement feature. A latch is configured to receive the strap. The latch includes a body and a finger extending from the body. The body is pivotable relative to the frame between a locked position for engaging the finger with the engagement feature and an unlocked position for disengaging the finger from the engagement feature. The finger includes a tip spaced from the body. The finger extends from the body beyond the strap to the tip when the latch is in the locked position for engaging the engagement feature of the strap.

The present invention also includes a tree stand comprising a frame, a latch coupled to the frame, and a strap for attaching the frame to a tree. The strap includes at least one engagement feature. The latch is configured to receive the strap and the strap is selectively moveable relative to the latch in a tightening direction and in a loosening direction opposite the tightening direction. The latch is pivotable relative to the frame between a locked position for engagement with the engagement feature and an unlocked position disengaged with the engagement feature. The engagement feature of the strap includes a stopping surface engaging the latch when the latch is in the locked position and the strap is biased in the loosening direction. The engagement feature includes a tapering surface opposite the stopping surface and engaging the latch when the strap is moved in the tightening direction for moving the latch toward the unlocked position.

The finger of the latch guides the engagement feature into the recess such that the latch automatically engages the engagement feature of the strap when the tree stand is mounted in a tree. Specifically, the weight of the frame biases the engagement feature toward the finger when the frame hangs on the tree. Further, the weight of an occupant supported on the frame also biases the engagement feature toward the finger. As such, when the weight of the frame and the occupant biases the engagement feature toward the finger, the finger guides the engagement feature into the recess defined by the acute angle, where the engagement feature is locked relative to the frame. This automatic locking of the strap relative to the latch advantageously ensures that the strap remains engaged with the latch during use of the tree stand. In other words, the weight of the frame and the occupant biases the latch toward the locked position. In addition, this bias must be overcome to pivot the latch to the unlocked position, which reduces the likelihood of accidental movement of the latch from the locked position to the unlocked position.

Because the finger extends from the body beyond the strap to the tip when the latch is in the locked position, the finger firmly engages the engagement feature and the likelihood of unintentional slippage of the strap relative to the latch is reduced. In addition, this feature increases the arc along which the finger must be pivoted to disengage the finger from the engagement feature to reduce likelihood of accidental movement of the latch from the locked position to the unlocked position.

Since the tapering surface opposite engages the latch when the strap is moved in the tightening direction for moving the latch toward the unlocked position, the strap can be fed into the latch with one hand. Specifically, one hand is used to move the strap in the tightening direction and, during such movement, the engagement feature engages the latch to move the latch toward the unlocked position, i.e., without manually moving the latch to the unlocked position by hand. Once the strap is positioned in the desired position relative to the latch, the latch is returned to the locked position and the stopping surface engages the latch when the strap is biased in the loosening direction.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

With reference to the Figures, wherein like numerals indicate like parts throughout the several views, a tree stand 10 is generally shown. The tree stand 10 is typically used to elevate an occupant (not shown), typically a hunter, in a tree. This elevated positioning, for example, raises the hunter above the typical sight line of game and improves the sight line and scent control of the hunter. The hunter can be, for example, an archery hunter, a firearm hunter, a crossbow hunter, etc.

Figure 1:
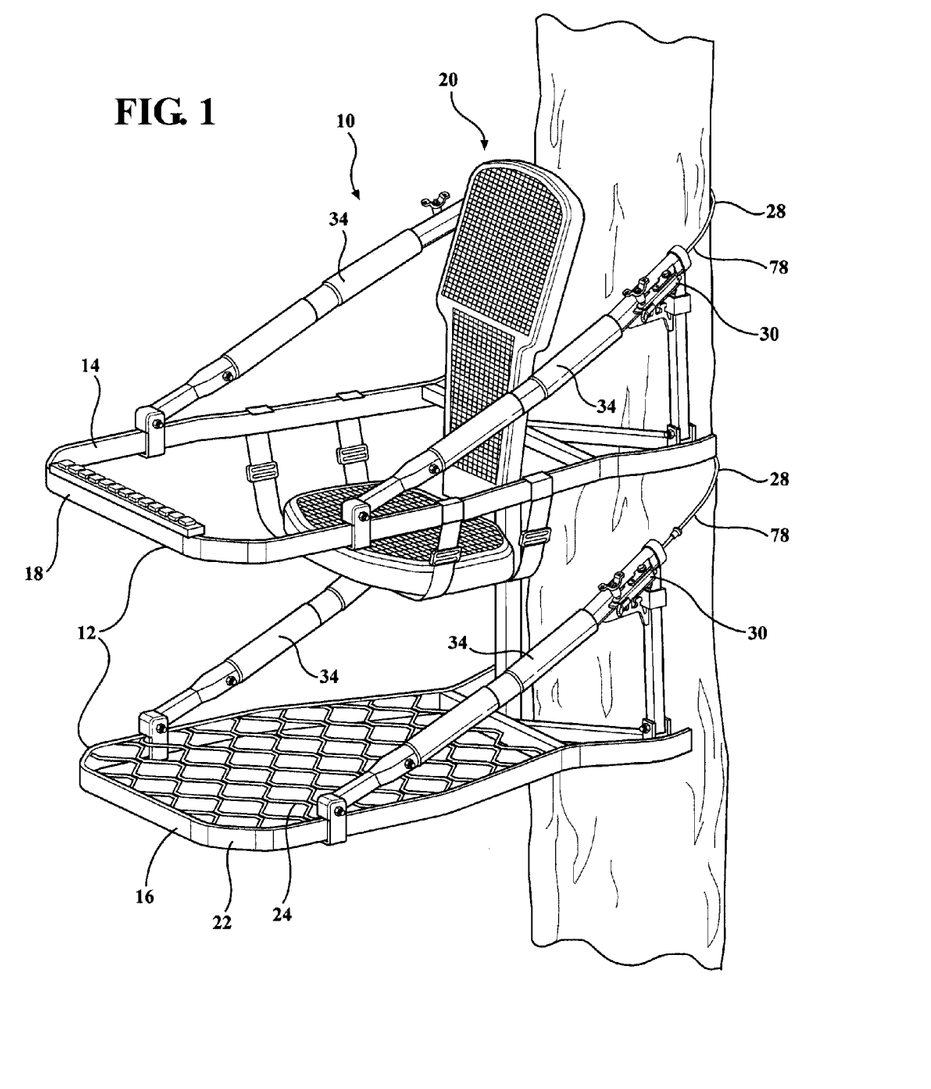
FIG. 1 is a perspective view of a tree stand attached to a tree.

The tree stand 10 shown in the Figures is a climbing tree stand that is mounted to a tree, as shown in FIG. 1. It should be appreciated that the tree stand 10 can be of any type for mounting to a stationary support, such as the tree of FIG. 1. For example, the tree stand 10 can be a stationary hang-on stand, a ladder stand, climbing sticks for use with any type of platform, etc.

The tree stand 10 includes a frame 12 for supporting the occupant in the tree. For example, the frame 12 shown in the Figures, i.e., the frame 12 of the climbing tree stand 10, includes an upper section 14 and a lower section 16 spaced from the upper section 14. Alternatively, the frame 12 can be of any type for any component of any type of tree stand 10 without departing from the nature of the present invention. As such, the frame 12 can include one section, two sections (as shown in the Figures), or any other number of sections.

The upper section 14 and the lower section 16 are independently mounted to the tree and are selectively moveable on the tree relative to each other. A tether (not shown) can connect the upper section 14 and the lower section 16 to avoid accidental separation of the upper second and the lower section 16 beyond the length of the tether.

Figure 2:
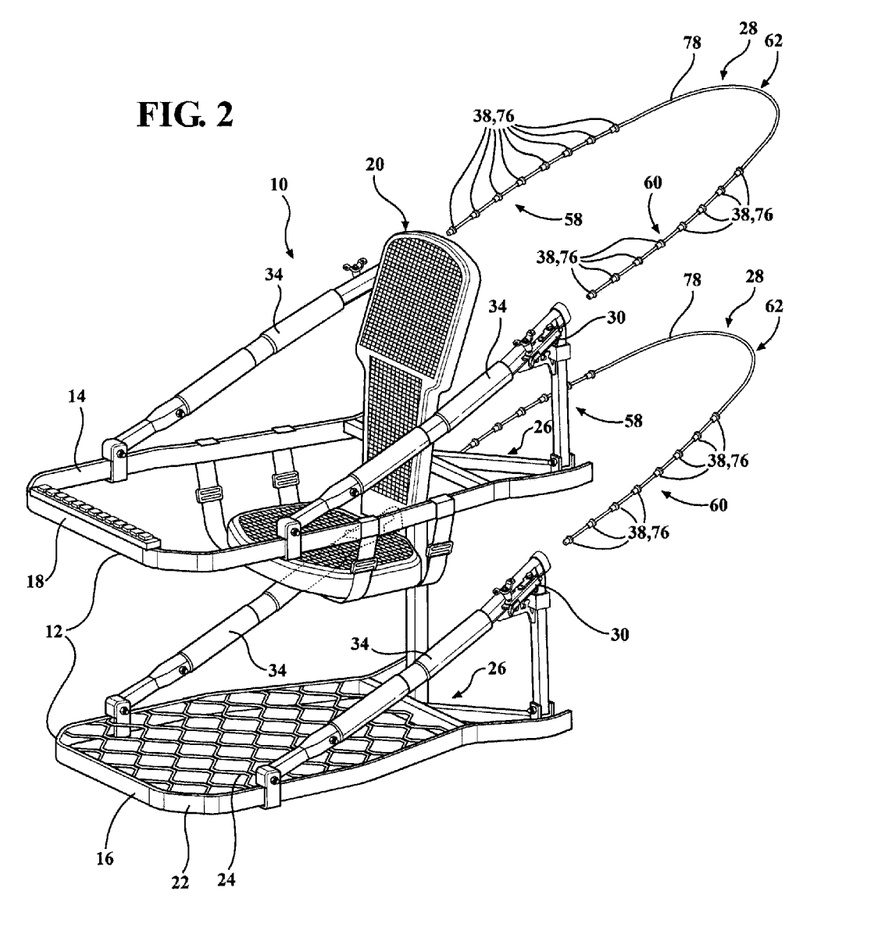
FIG. 2 is a partially exploded perspective view of the tree stand with straps exploded away from a frame.
Figure 3:
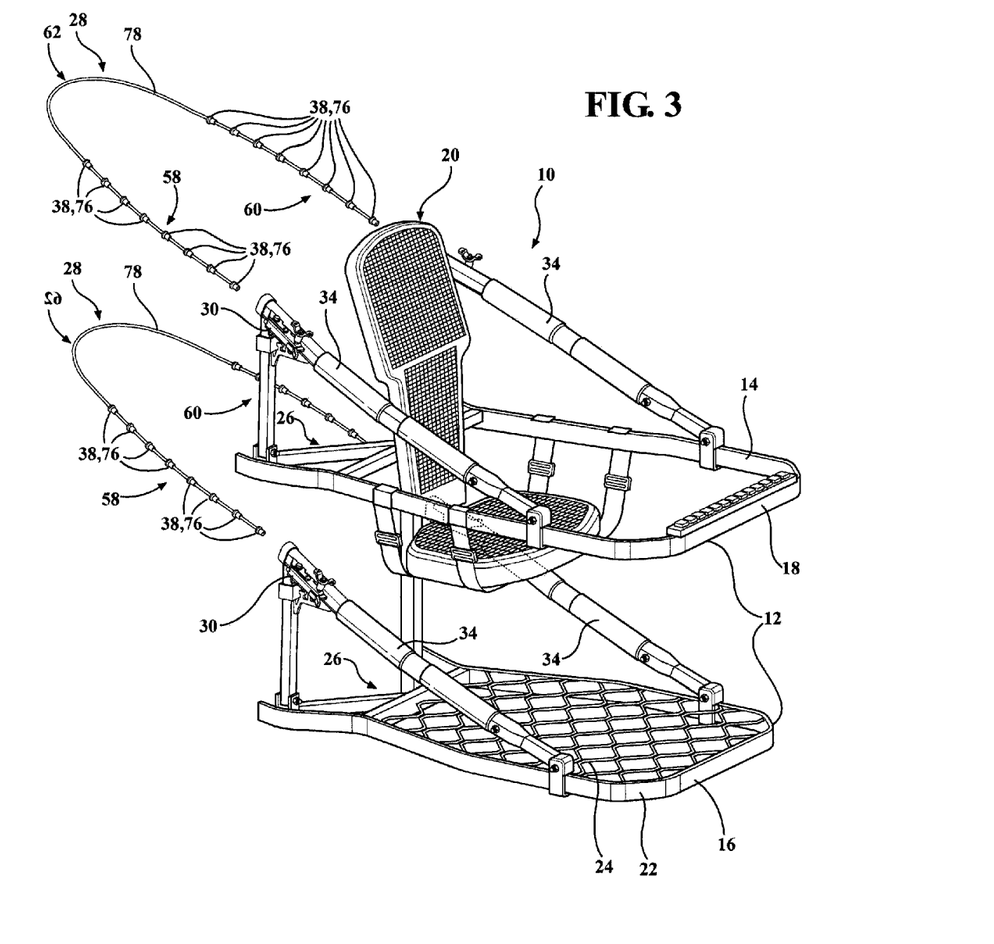
FIG. 3 is another partially exploded perspective view of the tree stand with the straps exploded away from the frame.

The upper section 14 includes a rail 18 and a seat 20 coupled the rail 18. The seat 20 can be tethered to the rail 18, as shown in FIGS. 1-3. Alternatively, the seat 20 can be integrally fixed to the rail 18, e.g., a metal grid that is fixed to the rail 18 by unitary construction, welding, fastening, etc.

In any event, the seat 20 includes a seat bottom for supporting the occupant and can include a seat back, as shown in FIGS. 1-3, for the occupant to lean against. The rail 18 shown in FIGS. 1-3, for example, is configured to surround the occupant to aid in retaining the occupant in the upper section 14, i.e., is a guard.

The lower section 16 includes a rail 22 and a footrest 24 coupled to the rail 22. The footrest 24 can be integrally fixed to the rail 22. For example, as shown in FIGS. 1-3, the footrest 24 is a metal grid that is fixed to the rail 22, typically by welding. Alternatively, the footrest 24 can be coupled to the rail 22 in any suitable fashion. The lower section 16 can include features (not shown) for enabling the occupant to engage the lower section 16 to reposition the lower section 16 relative to the upper section 14.

The upper section 14 and the lower section 16 each define a notch 26 for receiving the tree, as shown in FIG. 1. The rail 18 of the upper section 14 and the rail 22 of the lower section 16, for example, define the notch 26. Teeth (not shown) or other gripping features can be arranged along the notch 26 for gripping the tree when the tree stand 10 is disposed on the tree.

Figure 13:
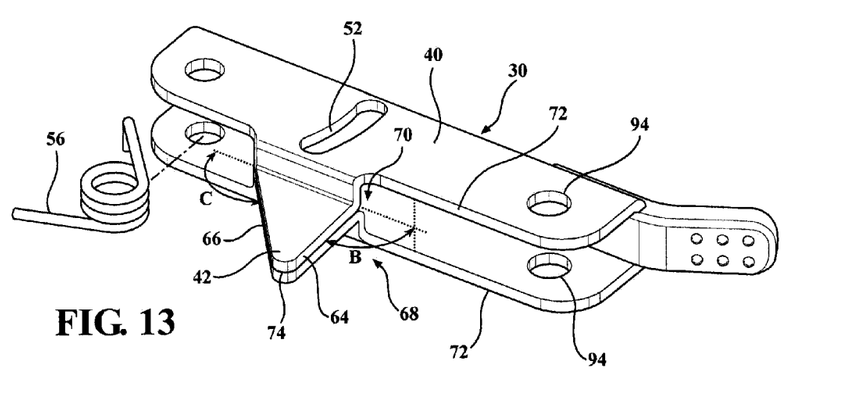
FIG. 13 is a perspective view of the latch of the embodiment of FIG. 12.
Figure 14:
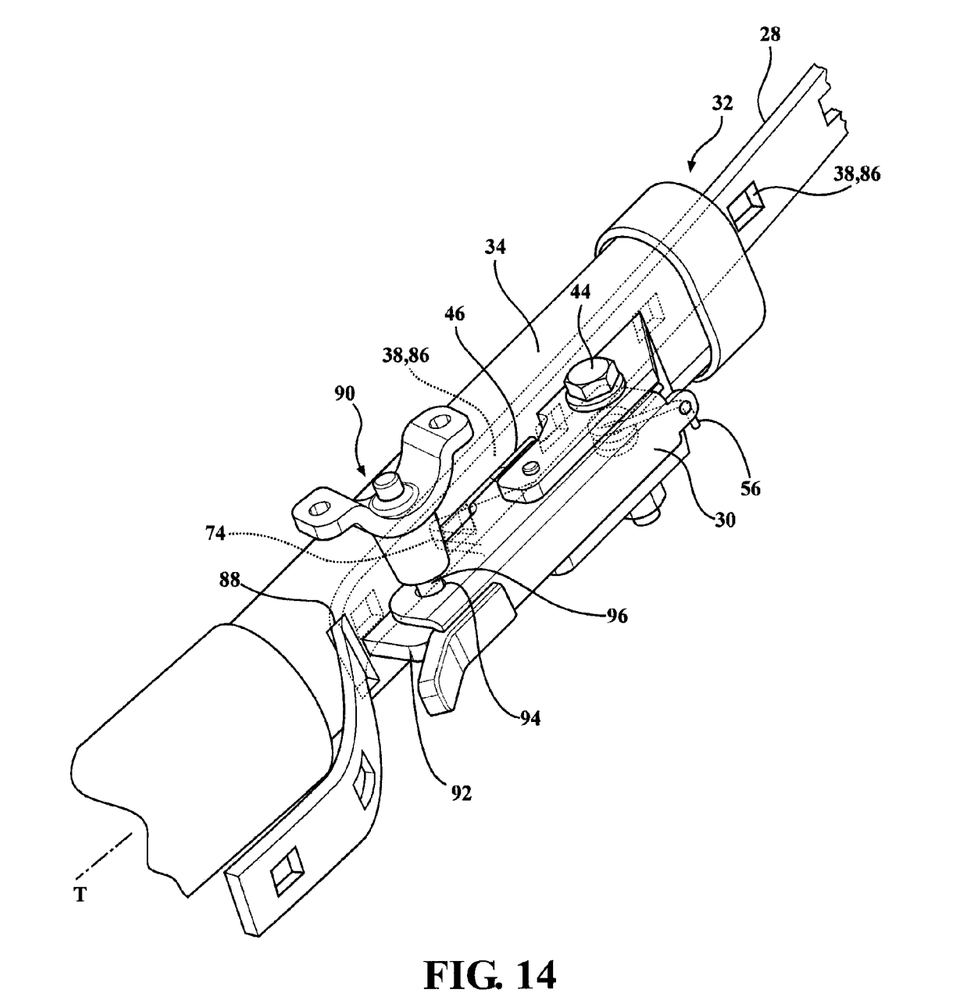
FIG. 14 is a perspective view of a portion of the of the frame supporting the latch and the strap of the second embodiment.

With reference to FIGS. 1-5, the tree stand 10 includes a strap 28 for attaching the frame 12 to the tree and a latch 30 coupled to the frame 12 and configured to receive the strap 28. As set forth below, the latch 30 selectively engages the strap 28 for adjusting the strap 28 relative to the frame 12. As shown in FIG. 1, the strap 28 extends from the frame 12 around the tree and is adjustable relative to the frame 12 to tighten/loosen about the tree. As set forth further below, two embodiments of the strap 28 and latch 30 are shown in the Figures by way of example. Specifically, one embodiment, referred to herein as the "first embodiment" merely for identification purposes, is shown in FIGS. 1-11. Another embodiment, referred to herein as a "second embodiment" merely for identification purposes, is shown in FIGS. 12-14.

In the configuration shown in the Figures, the tree stand 10 includes two straps 28 and two latches 30 for each strap 28. Specifically, two latches 30 are fixed to the upper section 14 of the frame 12 and two latches 30 are fixed to the lower section 16. However, it should appreciated that the tree stand 10 can include any number of straps 28 and any number of latches 30 without departing from the nature of the present invention. For example, the tree stand 10 can include one strap 28 fixed to the frame 12 at one end of the strap 28 and one latch 30 fixed to the frame 12 for selectively engaging the other end of the strap 28.

With reference to FIGS. 1-5, the frame 12 of the tree stand 10 can present an open end 32 for receiving the strap 28. For example, the frame 12 includes the tube 34 and the tube 34 presents the open end 32. The open end 32 is defined by an interior wall 36 of the tube 34. In the configuration shown in the figures, the tube 34 also supports the latch 30. The tube 34, for example, includes a first end fixed to the rail 18, 22 with the open end 32 spaced from the first end. The tube 34 extends along a tube axis T and the strap 28 is received in the tube 34 along the tube axis T. In the alternative to the tube 34, it should be appreciated that any portion of the frame 12 can present the open end 32 and the latch 30 can be supported on any portion of the frame 12. Regardless of the location of the open end 32 on the frame 12, the open end 32 is typically spaced from the notch 26, e.g., vertically spaced, to wedge the tree between the notch 26 and the strap 28 when supported on the tree, as shown in FIG. 1.

Figure 8:
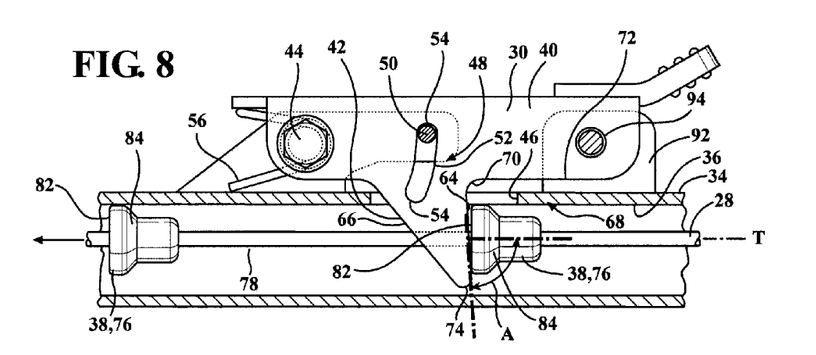
FIG. 8 is a cut-away view of a portion of the frame with the latch in the locked position and the strap being biased in a loosening direction.
Figure 9:
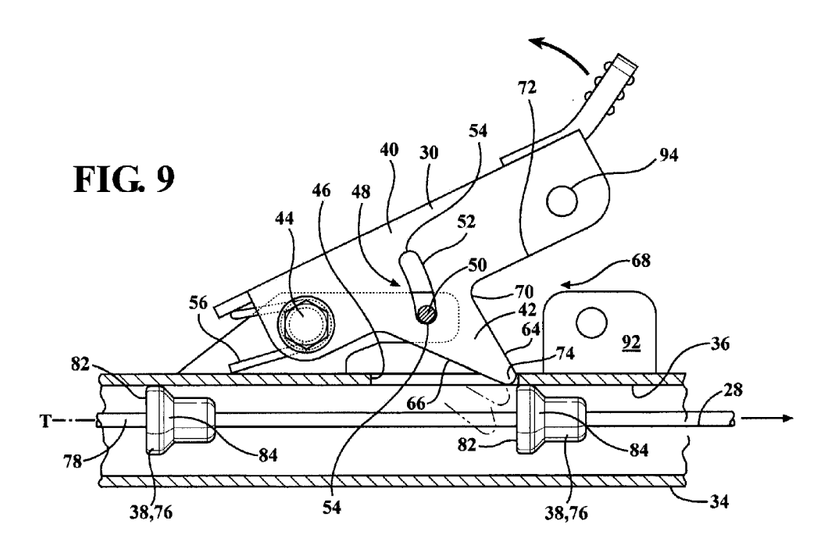
FIG. 9 is a cut-away view of a portion of the frame with the latch in the unlocked position.
Figure 12:
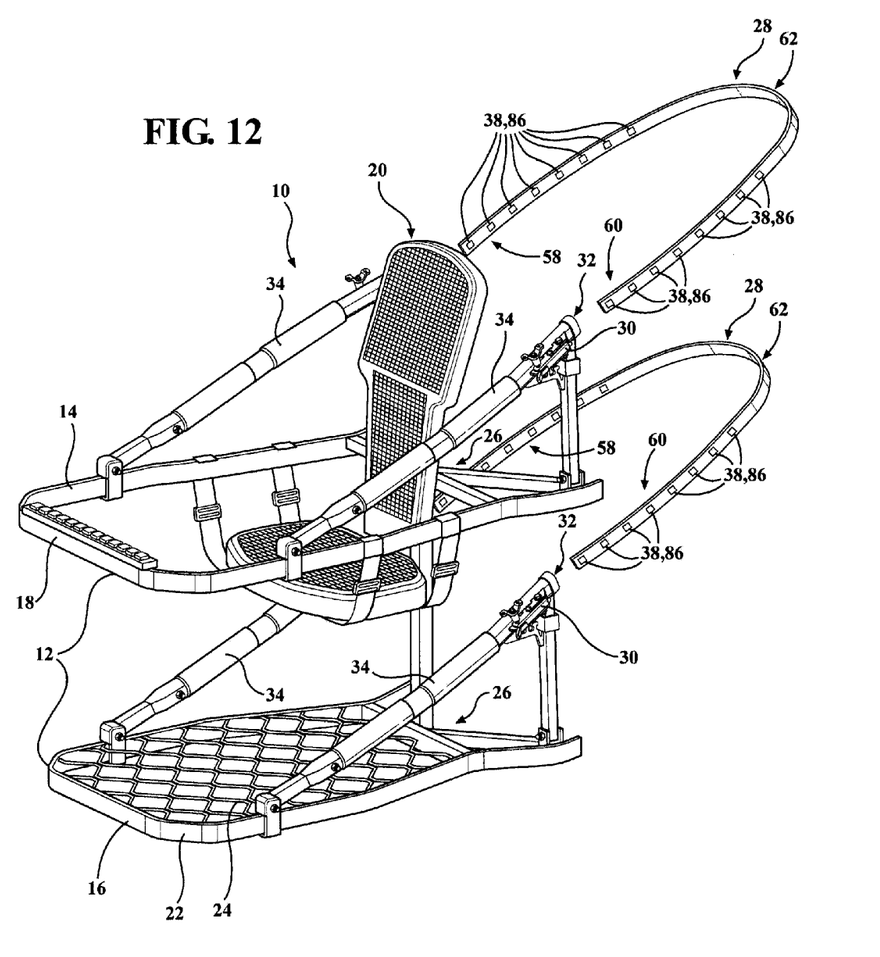
FIG. 12 is a perspective view of another embodiment of the tree stand.

As best shown in FIGS. 2 and 12, the strap 28 includes at least one engagement feature 38 for selectively engaging the latch 30, as set forth further below. The latch 30 selectively engages the engagement feature 38 to selectively fix the strap 28 relative to the frame 12. The latch 30 is moveable relative to the frame 12 between a locked position, as shown in FIG. 8, for engaging the engagement feature 38 of the strap 28 and an unlocked position, as shown in FIG. 9, for being disengaged with the engagement feature 38 of the strap 28.

As set forth further below, the latch 30 includes a body 40 pivotably coupled to the frame 12. The latch 30 includes at least one finger 42 extending from the body 40 for selectively engaging the engagement feature 38. In such an embodiment, the latch 30 is pivotable relative to the frame 12 between the unlocked position and the locked position.

With reference to FIGS. 4-9, the latch 30 pivots relative to the frame 12 about a pivot point P. For example, a bolt 44 extends through the latch 30 and the frame 12 to define the pivot point P. An arm, for example, extends from the frame 12, e.g., from the tube 34. The arm receives the bolt 44 to define the pivot point P.

The frame 12, e.g., the tube 34, defines a slot 46 and the latch 30 extends through the slot 46 for engaging the strap 28 when the latch 30 is in the locked position. As best shown in FIG. 8, for example, the finger 42 of the latch 30 extends through the slot 48 and into the tube 34 when the latch 30 is in the locked position, and the finger 42 is laterally offset from the strap 28 at the cable 78. With reference to FIGS. 4-9, the strap 28 extends along the slot 46 and adjacent the slot 46 such that the finger 42 engages the strap 28 in the locked position, as set forth further below. FIGS. 4-9 also clearly show that the cable 78 is positioned offset in a perpendicular direction the finger 42. For example, cable 78 is shown behind the finger 42 in FIG. 8, and the phantom lines of FIG. 9 show movement of the finger 42 laterally offset from the cable 78.

The latch 30 and the frame 12 include a guide 48 for limiting movement of the latch 30 relative to the frame 12 between the locked position and the unlocked position. Specifically, the guide 48 includes a pin 50 and a groove 52. One of the frame 12 and the latch 30 presents the pin 50 and the other of the frame 12 and the latch 30 defines the groove 52 that receives the pin 50. The groove 52 extends between and terminates at two ends 54 spaced from each other along an arcuate path. One end 54 of the groove 52 abuts the pin 50 when the latch 30 is in the locked position to prevent the latch 30 from pivoting beyond the locked position and the other end 54 of the groove 52 abuts the pin 50 when the latch 30 is in the unlocked position to prevent the latch 30 from pivoting beyond the unlocked position. In the figures, the pin 50 extends from the arm and the latch 30 defines the groove 52. Alternatively, the pin 50 can extend from the latch 30 and the finger 42 can define the groove 52.

The latch 30 is typically spring loaded and is biased toward the locked position. For example, with reference to FIGS. 5-9, a spring 56 is disposed between the latch 30 and the frame 12 and the spring 56 biases the latch 30 toward the locked position. A sufficient force can be applied to the latch 30 to overcome the spring 56 and pivot the latch 30 from the locked position to the disengaged position. The spring 56, for example, is a torsion spring disposed about the pivot point P and receiving the bolt 44. Alternatively, the spring 56 can be any suitable type of spring 56 in any suitable position. The latch 30 can include a finger 42 grip, for example, for grasping the latch 30 and moving the latch 30 from the locked position to the unlocked position.

The strap 28, for example, includes a plurality of engagement features 38 spaced from each other and the latch 30 selectively engages one of the engagement features 38 to selectively fix the strap 28 relative to the frame 12. In such a configuration, the strap 28 can be adjusted relative to the frame 12 by alternatively engaging the latch 30 with a different one of the engagement features 38.

The strap 28 is selectively moveable relative to the latch 30 in a tightening direction and in a loosening direction opposite the tightening direction. Movement in the tightening direction is shown, for example, with an arrow in FIGS. 6-7. When the strap 28 is moved in the tightening direction, the length of strap 28 extending from the frame 12 is shortened to tighten the strap 28 around the tree. The loosening direction is shown, for example, with an arrow in FIGS. 8-9. When the strap 28 is moved in the loosening direction, the length of the strap 28 extending from the frame 12 is lengthened to loosen the strap 28 relative to the tree. With reference to FIG. 1, when the tree stand 10 is mounted to the tree, the weight of the frame 12 biases the strap 28 in the loosening direction such that one of the engagement features 38 engages the finger 42 of the latch 30.

With reference to FIGS. 1-3, the strap 28 includes a first end 58 including a plurality of engagement features 38, a second end 60 including a plurality of engagement features 38, and an intermediate portion 62 extending from the first end 58 to the second end 60 of the strap 28. As shown in FIGS. 1 and 12, the engagement features 38 of the first end 58 are positioned engage one of the latches 30 and the engagement features 38 on the second end 60 are positioned to engage the other of the latches 30. Alternatively, the second end 60 of the strap 28 can be permanently affixed to the frame 12. In other words, in such an embodiment, the first end 58 of the strap 28 is adjustable relative to the frame 12 and the second end of the strap 60 is not adjustable.

The latch 30 and the engagement features 38 are configured to retain the latch 30 in the locked position when the latch 30 is in the locked position and the strap 28 is biased in the loosening direction. The finger 42 of the latch 30 is spaced from the pivot point P and positioned relative to the pivot point P such that one of the engagement features 38 engages the finger 42 to bias the latch 30 toward the locked position when the latch 30 is in the locked position and the strap 28 is biased in the loosening direction.

For example, with reference to FIG. 8, the latch 30 pivots counter-clockwise from the locked position to the unlocked position and pivots clockwise from the unlocked position to the locked position. The finger 42 extends from the body 40 of the latch 30 in a direction such that one of the engagement features 38 engages the finger 42 and biases the finger 42 toward the locked position, i.e., clockwise in the configuration of FIG. 8, when the strap 28 is biased in the loosening direction. In such a configuration with one of the engagement features 38 biasing the latch 30 toward the locked position, one end 54 of the groove 52 abuts pin 50 to prevent the latch 30 from moving beyond the locked position.

The finger 42 includes a locking surface 64 and an unlocking surface 66. The locking surface 64 engages one of the engagement features 38 when the latch 30 is in the locked position and the strap 28 is biased in the loosening direction. The unlocking surface 66 engages the engagement feature when the strap 28 is moved in the tightening direction. The locking surface 64 and the unlocking surface 66 of the finger 42 of the latch 30 are flat in the figures. Alternatively, the locking surface 64 and/or the unlocking surface 66 can be non-planar, e.g., curved without departing from the nature of the present invention.

As set forth above, the latch 30 includes the body 40 and at least one finger 42 extending from the body 40. When the latch 30 is in the locked position, the finger 42, specifically the locking surface 64 of the finger 42, extends in the tube 34 in a direction away from body 40 at an angle A. Angle A is typically an acute angle, i.e., less than 90°, relative to the tube axis T, as shown in FIG. 8. As one example, the acute angle A is 80°-85°.

This configuration directs the engagement feature 38 toward the interior wall 36 of the tube 34, as shown in FIG. 8 to trap the engagement feature 38 between the interior wall 36 of the tube 34 and the engagement feature 38 when the strap 28 is biased in the loosening direction. By trapping and retaining the engagement feature 38 between the finger 42 and the interior wall 36 of the tube 34, the latch 30 reduces the likelihood of inadvertent disengagement of the latch 30 and the engagement feature 38.

Figure 11:
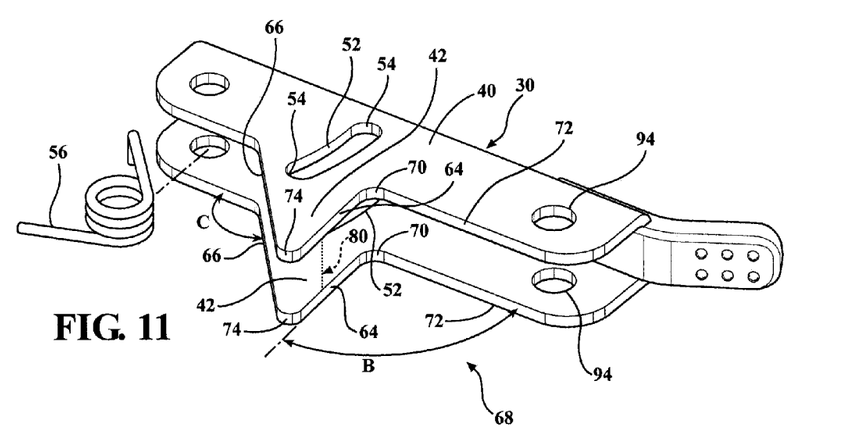
FIG. 11 is a perspective view of the latch.

The latch 30 defines a recess 68 between the finger 42 and the body 40 for receiving the engagement feature 38 when the latch 30 is in the locked position. With reference to FIGS. 11 and 13, the finger 42 extends from the body 40 along the recess 68 at an angle B. Specifically, the locking surface 64 of the finger 42 extends along the recess 68 at the angle B relative to a side surface 72 of the body 40. Angle B is typically an acute angle, i.e., less than 90°, relative to the body 40 for guiding the engagement feature 38 into the recess 68. As one example, the angle B between the locking surface 64 and the body 40 is 80°-85°.

Since the locking surface 64 of the latch 30 extends along the recess 68 at the angle B, the finger 42 directs the engagement feature 38 toward the body 40 when the latch 30 is in the locked position and the strap 28 is biased in the loosening direction to trap and retain the engagement feature 38 against the finger 42, e.g., between the finger 42 and the interior wall 36 of the tube 34 as shown in FIG. 8. As set forth above, by trapping and retaining the engagement feature 38 between the finger 42 and the interior wall 36 of the tube 34, the latch 30 reduces the likelihood of inadvertent disengagement of the latch 30 and the engagement feature 38.

Since the locking surface 64 of the finger 42 extends at the angle B relative to the body 40, the latch 30 defines a crotch 70 between the finger 42 and the body 40. In the configuration shown in FIG. 8, the crotch 70 is disposed outside of the tube 34 and the locking surface 64 guides the engagement feature 38 toward the crotch 70 and against the interior wall 36 when the strap 28 is biased in the loosening direction. Alternatively, the crotch 70 can be disposed inside the tube 34, in which case the engagement feature 38 is trapped in the crotch 70 when the latch 30 is in the locked position and the strap 28 is biased in the loosening direction.

The side surface 72 of the body 40 and the tube axis T are arranged relative to each other, e.g., in parallel in the figures, such that the locking surface 64 of the finger 42 extends from the slot 48 into the tube 34 at the angle A, as set forth above. In the configuration shown, for example, in FIGS. 6-9, 11, and 13, the side surface 72 of the body 40 and the tube axis T extend in parallel and the angle A and the angle B are equal to each other. Alternatively, the angle A, the angle B, and the relative angle between the side surface 72 and the tube axis T can be any angles sufficient to trap the engagement feature 38 against the interior wall 36 of the tube 34, in the crotch 70 of the latch 30, and/or the side surface 72 when the latch 30 is in the locked position and the strap 28 is biased in the loosening direction. In one embodiment, for example, the locking surface 64 of the finger 42 can extend from the body 40 at a right angle, i.e., the angle B is 90°. In such a configuration, the latch 30 can be coupled to the frame 12 in a position such that the finger 42 extends in a direction from the body 40 in the tube 34 at an acute angle relative to the tube axis T.

The locking surface 64 of the finger 42 extends from the body 40 to the strap 28 and beyond the strap 28 when the latch 30 is in the locked position for engaging the engagement feature 38 of the strap 28. For example, with reference to FIGS. 8 and 14, the finger 42 extends from the body 40, through the slot 48, and past the cable 78. In other words, the locking surface 64 of the finger 42 presents a tip 74, i.e., a terminal end, spaced from the body 40 and the engagement feature 38 engages, e.g., abuts, the locking surface 64 of the finger 42 between the body 40 and the tip 74. As such, when the latch 30 is in the locked position and the strap 28 is moved in the loosening direction, one of the engagement features 38 remains engaged with the locking surface 64 of the latch 30 between the body 40 and the tip 74 to bias the latch 30 toward the locked position, as set forth above. As best shown in FIGS. 6-9, the tip 74 of the finger 42 is spaced from the interior wall 36 of the tube 34 when the latch 30 is in the locked position. Alternatively, the tip 74 of the finger 42 can abut the interior wall 36 of the tube 34 when the latch 30 is in the locked position.

The configuration of the extension of the finger into the tube 34 at the acute angle A when the latch is in the locked position, as discussed above, creates a bias that must be overcome in order to pivot the latch to the disengaged position. Specifically, with reference to FIGS. 8 and 9, any bias of the engagement member against the finger of the latch in the loosening direction must be overcome and the engagement member must be moved slightly in the tightening direction in order for finger to disengage the engagement member, i.e., to pass the tip 74 beyond the engagement member.

Figure 6:
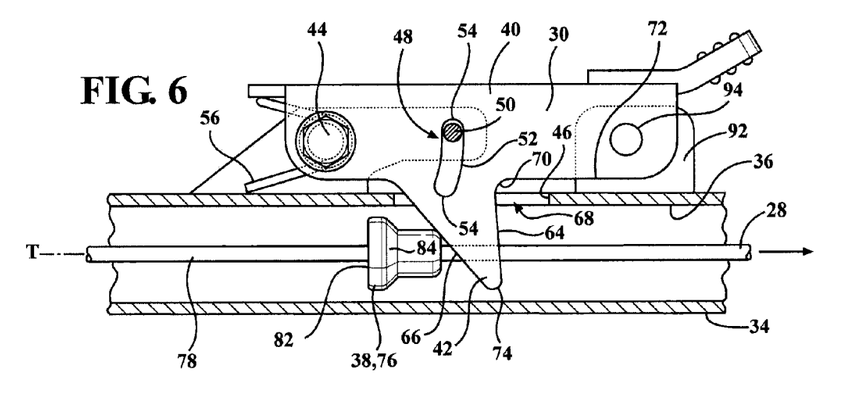
FIG. 6 is a cut-away view of a portion of the frame with the latch in a locked position and the strap being moved in a tightening direction.
Figure 7:
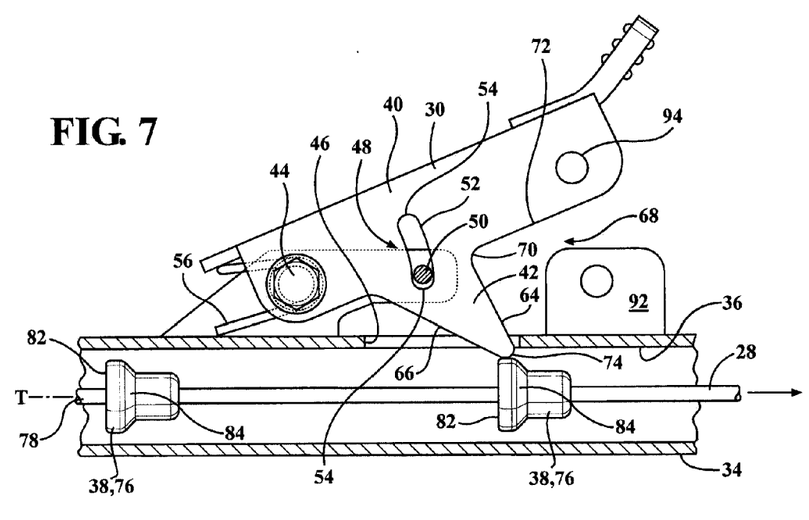
FIG. 7 is a cut-away view of a portion of the frame with the latch biased toward an unlocked position by the strap as the strap moves in the tightening direction.

With reference to FIGS. 11 and 13, the unlocking surface 66 of the finger 42 extends from the body 40 at an obtuse angle C, i.e., greater than 90°. Specifically, when the latch 30 is in the locked position, the unlocking surface 66 extends in the tube 34 in a direction away from body 40 at an obtuse angle relative to the tube axis T. As such, when the strap 28 is moved in the tightening direction, as shown in FIGS. 6 and 7, the engagement feature 38 biases the latch 30 toward the unlocked position. Specifically, the engagement feature 38 slides along the unlocking surface 66 as the engagement feature 38 moves along the tube axis T thereby forcing the latch 30 toward the unlocked position against the bias of the spring.

Figure 10:
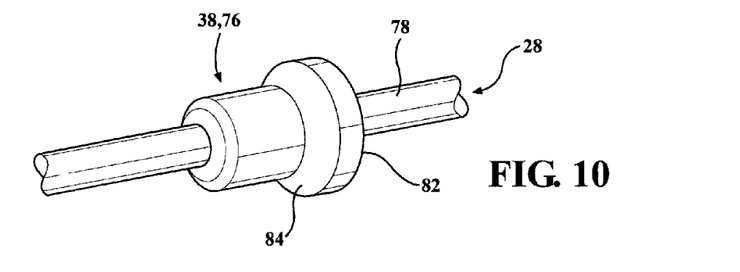
FIG. 10 is a perspective view of a portion of the strap including a bulb.

As set forth above, the first embodiment of the latch 30 and the strap 28 is shown in FIGS. 1-11. With reference to FIGS. 2 and 3, in the first embodiment, the engagement feature 38 is a protrusion 76. Specifically, in the first embodiment, the strap 28 includes a cable 78 and a plurality of protrusions 76 fixed to the cable 78 and spaced from each other. The protrusions 76 are typically crimped on the cable 78 or, alternatively, can be fixed along the cable 78 in any suitable fashion. The cable 78 is typically braided metal, such as steel, and the protrusions 76 are typically metal, such as steel, or alternatively, the cable 78 and protrusions 76 can be formed of any suitable material. With reference to FIG. 10, the protrusion 76 is bulb shaped, i.e. is a bulb fixed to the cable 78, as described further below. It should be appreciated that the protrusion 76 can be of any suitable shape without departing from the nature of the present invention.

The latch 30 is configured to receive the strap 28. As best shown in FIG. 11, the latch 30 of the first embodiment includes a pair of fingers 42 defining a space 80 therebetween configured to receive the strap 28. As shown in FIG. 8, the cable 78 extends between the fingers 42, and the engagement features 38 engage both fingers 42 when the latch 30 is in the locked position and the strap 28 is biased in the loosening direction. The fingers 42 are typically identical to each other and the description of the finger 42 above is applicable to both fingers 42 of the latch 30 of the first embodiment.

The engagement features 38 are configured to be disposed between and engage the fingers 42 when the latch 30 is in the locked position. In other words, the protrusion 76 is sized and shaped to engage the fingers 42. In particular, each engagement feature 38 of the strap 28 includes a stopping surface 82 engaging the latch 30 when the latch 30 is in the locked position and the strap 28 is biased in the loosening direction. Specifically, the stopping surface 82 engages the locking surface 64 of the finger 42 of the latch 30 when the latch 30 is in the locked position and the strap 28 is biased in the loosening direction. The stopping surface 82 abuts the finger 42 at a position spaced from the pivot point P when the latch 30 is in the locked position and the strap 28 is biased in the loosening direction to bias the latch 30 toward the locked position, as set forth above.

Figure 4:
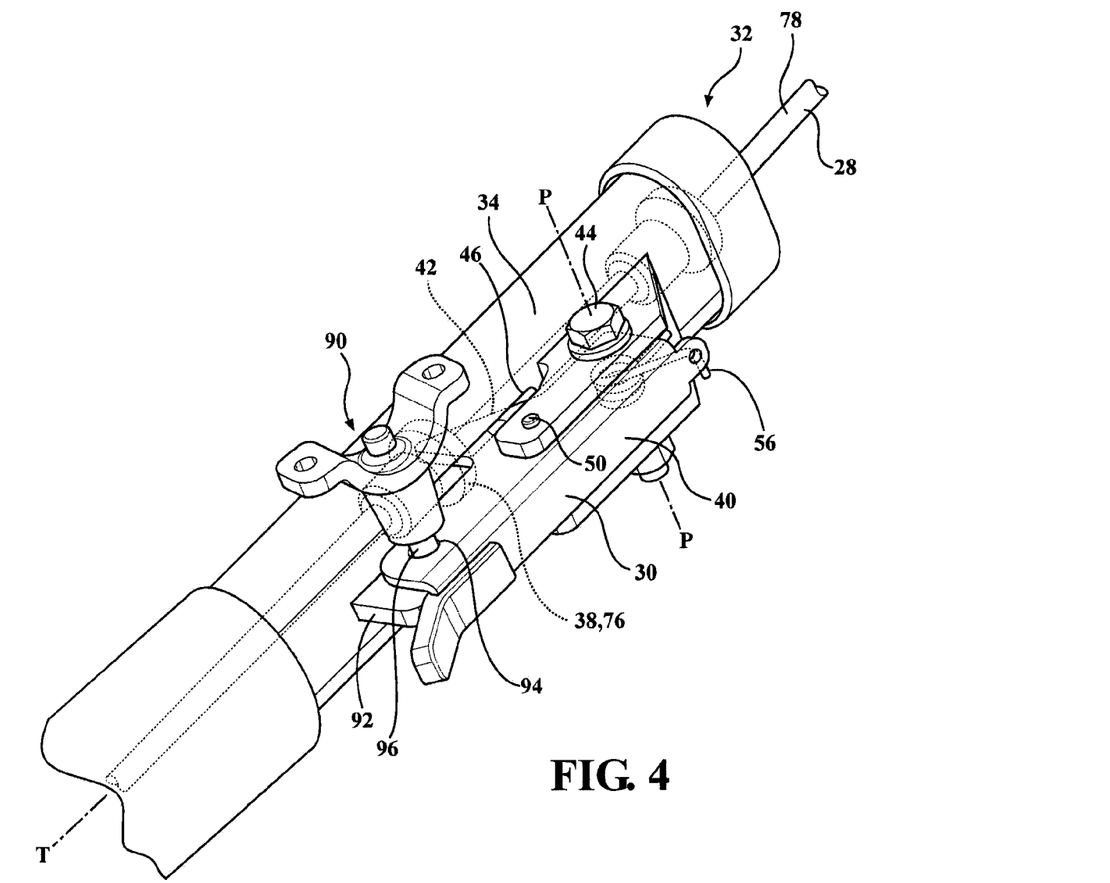
FIG. 4 is a perspective view of a portion of the frame supporting a latch and receiving the strap.

With reference to FIG. 4, the stopping surface 82 is larger than the space 80 between the fingers 42 such that the stopping surface 82 abuts the fingers 42 when the latch 30 is in the locked position and the strap 28 is biased in the loosening direction. The stopping surface 82 is planar in the figures and, alternatively, can be non-planar.

The engagement feature 38 includes a tapering surface 84 opposite the stopping surface 82 and engaging the latch 30 when the strap 28 is moved in the tightening direction for moving the latch 30 to the unlocked position. Specifically, the tapering surface 84 engages the unlocking surface 66 of the finger 42 of the latch 30 when the latch 30 is in the locked position and the strap 28 is moved in the tightening direction. As shown in FIGS. 6 and 7, as the strap 28 is moved in the tightening direction, the tapering surface 84 slides along the unlocking surface 66 and moves the latch 30 to the unlocked position. The tapering surface 84 abuts the finger 42 at a position spaced from the pivot point P when the strap 28 is moved in the tightening direction for moving the latch 30 to the unlocked position, as set forth above. As the latch 30 moves to the unlocked position, the engagement feature 38 moves past the finger 42 and the latch 30 returns to the locked position. This process is repeated as the strap 28 is moved in the tightening direction until the strap 28 is positioned in a desired position relative to the frame 12.

As set forth above, the second embodiment is shown in FIGS. 12-14. The engagement feature 38 of the second embodiment is a hole 86 defined in the strap 28 configured to receive the finger 42 when the latch 30 is in the locked position. Specifically, as shown in FIG. 12, each strap 28 includes a plurality of holes 86 spaced from each other. The strap 28 of the second embodiment is typically formed of a flexible material such as nylon strapping, leather, etc. The holes 86 are typically rectangular in shape, as shown in FIG. 14. Alternatively, the holes 86 can be of any suitable shape without departing from the nature of the present invention.

With reference to FIG. 14, the finger 42 extends from the body 40 through the hole 86 to the tip 74 when the latch 30 is in the locked position. In other words, the engagement feature 38 contacts the finger 42 between body 40 and the tip 74 when the latch 30 is in the locked position. When the latch 30 is in the locked position and the finger 42 extends through the hole 86, the strap 28 engages the locking surface 64 of the finger 42 when the strap 28 is biased in the loosening direction, as set forth above.

The engagement feature 38 is configured to pass the tip 74 when the latch 30 is in the unlocked position. In other words, the tip 74 of the finger 42 is disengaged with the hole 86 in the strap 28 when the latch 30 is in the unlocked position. When the latch 30 is in the locked position and the finger 42 extends through one of the holes 86, the strap 28 moves the latch 30 toward the unlocked position when the strap 28 is moved in the tightening direction. The frame 12 can define a slit 88 through which the strap 28 extends for gripping to pull the strap 28 in the tightening direction.

The strap 28 abuts the unlocking surface 66 of the finger 42 of the latch 30 when the strap 28 moves in the tightening direction and slides along the unlocking surface 66 to move the latch 30 toward the unlocked position. As the latch 30 moves to the unlocked position, the finger 42 disengages the hole 86 and rides along the strap 28 to the next hole 86, at which position the latch 30 returns to the locked position in the next hole 86. This process is repeated as the strap 28 is moved in the tightening direction until the strap 28 is positioned in a desired position relative to the frame 12.

Figure 5:
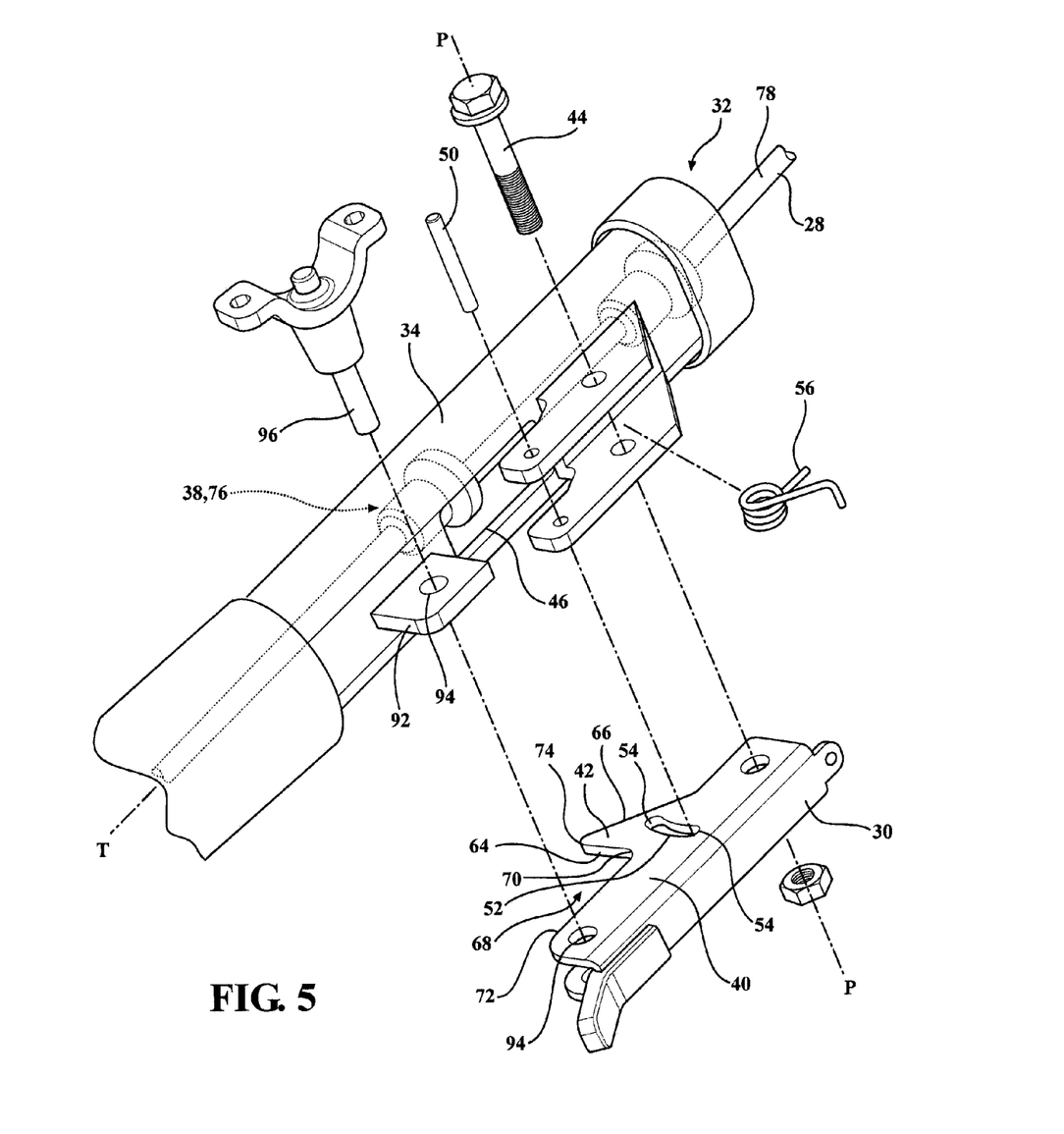
FIG. 5 is a partially exploded perspective view of a portion of the frame, the latch, and the strap.

With reference to FIGS. 4 and 14, in both the first and second embodiments, the tree stand 10 can include a lock 90 configured to selectively engage the latch 30 and the frame 12 for locking the latch 30 in the locked position relative to the frame 12. For example, as best shown in FIG. 5, the tube 34 can include a plate 92 defining a locking hole 94 and the latch 30 defines another locking hole 94 aligned with the locking hole 94 of the plate 92 when the latch 30 is in the locked position. The lock 90 includes a post 96 that extends through the locking holes 86 to prevent movement of the latch 30 from the locked position. The lock 90 can include any type of feature for selectively engaging the locking holes 86. In such a configuration, the lock 90 prevents the strap 28 from being moved relative to the latch 30 in the loosening direction or the tightening direction. As such, prior to a desired loosening or tightening of the strap 28 relative to the frame 12, the pin 50 is removed from the locking holes 94.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A tree stand comprising:
   a frame;
   a strap for attaching the frame to a tree and including at least one engagement feature, the at least one engagement feature having a cylindrical tip, a cylindrical protrusion, and a tapering surface positioned between the cylindrical tip and the cylindrical protrusion;
   a latch including a body pivotably coupled to the frame and being pivotable relative to the frame between a locked position for engaging the engagement feature of the strap and an unlocked position for being disengaged with the engagement feature of the strap;
   the latch including a finger extending from the body and defining a recess between the finger and the body for receiving the engagement feature when the latch is in the locked position, the finger being movable through a plane of motion between the unlocked and locked positions, the finger being positioned at least partially through the frame in the locked position, the strap being laterally positioned offset from the plane of motion when the latch is in the locked position, the recess being laterally positioned offset from the strap when the latch is in the locked position, wherein the latch includes a second finger spaced from the finger defining a space there between configured to receive the strap and the finger extending from the body along the recess at an acute angle relative to the body for guiding the engagement feature into the recess.

2. A tree stand as set forth in claim 1 wherein the engagement feature is a projection configured to be disposed between and engage the finger and the second finger when the latch is in the locked position.

3. A tree stand as set forth in claim 1 wherein the strap includes a plurality of engagement features spaced from each other.

4. A tree stand as set forth in claim 1 further comprising a lock configured to selectively engage the latch and the frame for locking the latch relative to the frame.

5. A tree stand as set forth in claim 4 further comprising a spring coupled to the latch and the frame and biasing the latch toward the locked position.

6. A tree stand comprising:
a frame;
a strap for attaching the frame to a tree and including at least one engagement feature, the at least one engagement feature having a cylindrical tip, a cylindrical protrusion, and a tapering surface between the cylindrical tip and the cylindrical protrusion;
a latch configured to receive the strap;
the latch including a body, a finger extending from the body, and a recess positioned between the finger and the body, the body being pivotable relative to the frame between a locked position for engaging the finger with the engagement feature and an unlocked position for disengaging the finger from the engagement feature; and the finger including a tip spaced from the body, the finger extending from the body beyond the strap to the tip when the latch is in the locked position for engaging the engagement feature of the strap, the finger being positioned at least partially through the frame when the latch is in the locked position, the finger moving within a plane of motion between the locked position and the unlocked position, the strap being perpendicularly offset from the plane of motion relative to the finger when the latch is in the locked position, the recess being positioned laterally offset from the strap when the latch is in the locked position, wherein the finger extends from the body along the recess at an acute angle relative to the body for guiding the engagement feature into the recess, wherein the latch includes a second finger spaced from defining a space therebetween configured to receive the strap.

7. A tree stand as set forth in claim 6 wherein the fingers extend adjacent to the strap from the body to the tip.

8. A tree stand as set forth in claim 6 wherein the engagement feature contacts the fingers between the body and the tip when the latch is in the locked position and wherein the engagement feature is configured to pass the tip when the latch is in the unlocked position.

9. A tree stand as set forth in claim 6 wherein the engagement feature is a projection configured to be disposed between and engage the finger and the second finger when the latch is in the locked position.

* * * * *